2,960,472

MIXED FERRITES OF MANGANESE, MAGNESIUM AND ZINC AND THEIR METHODS OF PREPARATION

Charles Guillaud, Bellevue, France, assignor to Centre National de la Recherche Scientifique, Paris, France, a French Government Administration, a society of France No Drawing. Filed Feb. 6, 1957, Ser. No. 638,467

Claims priority, application France Mar. 1, 1951

3 Claims. (Cl. 252—62.5)

The present invention relates to ferromagnetic ceramic materials essentially constituted by a solid solution of mixed oxides of iron, manganese, magnesium and zinc. These materials are prepared from fine powders of oxides of these metals which are mechanically mixed together to obtain a homogeneous mixture, then shaped into cores of the desired geometrical shape, after which said cores are subjected to a suitable thermal treatment. Said materials, which are generally designated by the name of "ferrites," crystallize in the cubic system and belong to the group of spinels.

The improved ferrites according to my invention have properties which can be perfectly well reproduced. Their initial magnetic permeability is high, their losses are low and they admit a high induction. These properties give such ferrites a very wide range of applications. In particular, it is interesting to use them as transformer cores in the technical field of telecommunications and in particular when it is necessary to transmit very wide frequency bands or very high frequencies. It is further interesting to use them as transformer cores intended to transmit relatively high powers, as it is the case for instance in the technical field of impulses.

These properties, together with a sufficiently low value of the coefficient of relative variation of magnetic permeability as a function of the temperature, may be obtained by complying with the hereinafter given proportions for the finished product constituted by the mixed ferrite of manganese, magnesium and zinc.

The ferrites according to my invention may be represented by the following conventional formula: ($u.Fe_2O_3$, $v.MnO$, $x.FeO$, $y.MgO$, $z.ZnO$), in which $u$, $v$, $x$, $y$ and $z$ represent the molar percentages of the respective constituents relatively to the whole of the oxides above referred to. Consequently $u+v+x+y+z$ is equal to 100%.

These molar percentages must, according to my invention, range within the following limits:

$49.7\% < u < 51\%$
$24\% < v < 38\%$
$0.5\% < x < 5.5\%$
$0.4\% < y < 5\%$
$z = [100-(u+v+x+y)]\%$

The percentage of bivalent iron in the product finally obtained may be determined in accordance with the concentration in reducing salt of a solution obtained by attacking with hydrochloric acid a sample of the material in the absence of air (that is to say in an inert atmosphere). In order thus to define a percentage of FeO, it is necessary to suppose that the whole of the manganese of the ferrite is in the bivalent state, this hypothesis being apparently the most probable. But even if this hypothesis were not correct and if there were actually manganese ions which would not be in the bivalent state in the ferromagnetic ceramic material, the result of the above indicated chemical test should conventionally be called "percentage of FeO."

The ferrites made of constituents the percentages of which range within the above indicated limits have the following properties:

(1) The initial magnetic permeability $\mu$ is higher than 1000.

(2) The induction for a magnetic field of 100 oersteds is higher than 3500 gauss at 20° C.

(3) I consider the following formula which defines the main loss coefficients:

$$\frac{R_p}{L} = F_n \frac{f^2}{(800)^2} + h \frac{NI}{l} \frac{f}{800} + t \frac{f}{800}$$

in which:

$R_p$ is the loss resistance in the ferrite core of an inductance coil, in ohms;
L is the inductance of this coil, in henrys;
$f$ is the frequency in hertz;
N is the number of turns in the winding of the coil;
I is the effective value of the current in the winding, in amperes;
$l$ is the length of the mean line of force, in cm.;
$F_n$ is the Foucault current (eddy current) loss coefficient;
$h$ is the hysteresis loss coefficient;
$t$ is the residual loss coefficient.

The Foucault current losses coefficient $F_n$, in ohms per henry, conventionally referred to a frequency of 800 hertz, is measured for frequencies ranging from 40 to 200 kilohertz, in a field sufficiently low to make the hysteresis losses negligible (1 millioersted) and at a temperature of 20° C., for circuits the cross-section of which is about $0.5 \times 0.6 = 0.3$ cm.$^2$.

The hysteresis losses coefficient H, expressed in ohms per henry, for a field of $$\frac{NI}{l} = 1 A.t/cm.$$

and also conventionally referred to a frequency of 800 hertz, is measured in fields ranging from 2 to 30 millioersteds, at 100 kilohertz and at a temperature of 20° C.

The residual losses coefficient $t$, expressed in ohms per henry and also conventionally referred to a frequency of 800 hertz, is deduced from the ordinate at the origin of curves $$\frac{R_p}{f.L} = g(f)$$

for a field equal to zero and a temperature of 20° C.

The ferrites according to the invention have loss coefficients ranging inside the following limits, for the above indicated percentage limits:

$$\frac{F_n}{\mu} \cdot 10^3 < 0.5, \quad \frac{h}{\mu 2} \cdot 10^6 < 1000, \quad \frac{t}{\mu} \cdot 10^3 < 12$$

(4) The coefficient of relative variation of the initial magnetic permeability as a function of the temperature $$\frac{1}{\mu} \frac{\Delta \mu}{\Delta T}$$

between 15 and 65° C. ($\mu$ being the initial magnetic permeability at 15° C. and T being the temperature in centigrade degrees), measured on a tore without an airgap, is lower than $8.10^{-3}$. It may be equal to zero and even become negative if the molar percentage of FeO($x$) becomes higher than 3.5.

In order to obtain ferromagnetic ceramic materials of high magnetic permeability and having reduced losses, it is necessary to observe, for the various constituents, the percentages above indicated. In particular, the molar percentage of $Fe_2O_3(u)$ in the ferromagnetic ceramic material must range from 49.7 to 51%, that is to say close to 50%. In other words, the stoechiometric condition must be substantially complied with. As a matter of fact, if the percentage of $Fe_2O_3$ is too low, the initial magnetic permeability is too low and the losses are too high, whereas if said percentage is too high, the initial magnetic permeability is still too low.

The molar percentage of $MnO(v)$ must range from 24 to 38% because for values lower than 24%, the Curie point is too low, whereas for values higher than 38%, the initial magnetic permeability is lowered and the temperature coefficient of permeability is too high.

The molar percentage of $FeO(x)$ must range from 0.5 to 5.5% because if this percentage drops below 0.5% or rises above 5.5%, in both cases there is a reduction of the initial magnetic permeability and an increase of the loss coefficients.

The molar percentage of magnesium oxide $(y)$ must range from 0.4 to 5%. The presence of a relatively low percentage of MgO greatly facilitates the obtainment of ferrites having constant properties, in particular a magnetic permeability of well determined value, without it being necessary to observe particular precautions in the preparation of said ferrites. A percentage of MgO above 5% would lead to a substantial reduction of the initial magnetic permeability, whereas a reduction of this percentage below 0.4% would be insufficient to ensure the above indicated uniformity of the properties of the ferrites.

The appended table, which indicates the results of a series of experiments I have made, justifies the above indicated percentage limits by showing their influence upon the initial magnetic permeability $\mu$, upon the Foucault current and hysteresis loss coefficients and upon the temperature coefficient of the initial magnetic permeability.

In Example VI, the MgO percentage is outside of the limits. In this case, the initial permeability has dropped below 1000 and the losses have increased.

Examples VII and VIII show the influence of an excess or an insufficient amount of FeO on the initial magnetic permeability and the losses.

Examples IX and X indicate the importance of the MnO percentage. For a percentage of 40%, the initial magnetic permeability has been considerably reduced and the temperature coefficient $\alpha_\mu$ of said permeability is high, whereas for a percentage of 20% the Curie point $\theta_c$ is low.

In order to prepare the materials the composition of which has been above indicated, I mix in a homogeneous fashion and through mechanical means the iron, magnesium, manganese and zinc oxides in the powdery form. This mixture is pressed into cores of the desired geometrical shape and these cores are subjected to a suitable thermal treatment.

Said oxides are preferably used, respectively in the form of iron sesquioxide $Fe_2O_3$, salt oxide of manganese $Mn_3O_4$, magnesium oxide MgO and zinc oxide ZnO.

During the thermal treatment, a portion of the iron sesquioxide $Fe_2O_3$ is transformed into iron protoxide FeO which is not present in the initial mixture. This is why the molar proportions of the various oxides which form the initial mixture are not quite the same as those of the oxides in solid solution in the final ferromagnetic ceramic material, but the differences are relatively small for the manganese, magnesium and zinc oxides. Therefore I give for these oxides the same limit for the molar percentages in the case of the mixture and in the case of the ferrite. The molar percentage of iron oxide in the form of $Fe_2O_3$ in the initial mixture must range from 50 to 56%.

The starting materials constituted by the oxides are reduced in very fine grains (their highest dimension being

Table

| Example | Composition in percent | | | | | $\mu$ | $\dfrac{F_n}{\mu} \cdot 10^3$ | $\dfrac{h}{\mu^2} \cdot 10^6$ | $\alpha_\mu$ | $\theta_c$ |
| --- | --- | --- | --- | --- | --- | --- | --- | --- | --- | --- |
| | $Fe_2O_3$ | MnO | FeO | MgO | ZnO | | | | | |
| I | 49.9 | 29.8 | 3.1 | 1 | 16.2 | 2,150 | 0.3 | 600 | | |
| II | 50.2 | 27.5 | 3.2 | 3 | 16.1 | 1,900 | 0.2 | 500 | | |
| III | 50.2 | 27.5 | 4. | 3 | 15.3 | 1,500 | 0.2 | 700 | | |
| IV | 51.5 | 27.5 | 3.2 | 3 | 14.8 | 750 | 0.3 | 500 | | |
| V | 49. | 27.5 | 3.2 | 3 | 17.3 | 900 | 0.6 | 3,500 | | |
| VI | 50.2 | 27.5 | 3.2 | 8 | 11.1 | 900 | 0.5 | 2,500 | | |
| VII | 50.2 | 27.5 | 7. | 3 | 12.3 | 700 | 1. | 2,500 | | |
| VIII | 50.2 | 27.5 | 0. | 3 | 19.3 | 800 | 0.6 | 1,500 | | |
| IX | 50.2 | 40. | 3.2 | 3 | 3.6 | 850 | 0.2 | 600 | $15 \cdot 10c{-3}$ | |
| X | 50.2 | 20. | 3.2 | 3 | 23.6 | 1,300 | 0.4 | 2,500 | | 95° C. |

In this table, the Examples I, II, III correspond to ferrites according to the invention, that is to say in which the percentages range within the above indicated limits. In particular Example III, where the percentage of FeO is 4%, has an initial permeability temperature coefficient which is practically equal to zero.

In order to permit an easy comparison, Examples IV, V, VI, VII, VIII, IX, X correspond to Example II. They differ therefrom only in that the percentage of one of the constituents ($Fe_2O_3$, MnO, FeO, MgO) has been taken outside of the limits I am claiming.

Examples IV and V differentiate from Example II in that the $Fe_2O_3$ percentages are outside of the limits above indicated, these percentages being higher than the higher limit in Example IV and lower than the lower limit in Example V. It will be seen that the initial magnetic permeability is considerably lowered and that the hysteresis and eddy current losses are increased in particular in the case of the ferrite which has a percentage of $Fe_2O_3$ lower than the suitable limits.

lower than 1 micron) and intimately mixed in a grinder. If necessary account is to be taken, when calculating the proportions of the oxides in the initial mixture, of the amount of iron that may be introduced by the grinder and also of impurities.

The impurities contained in the oxides which serve to prepare the ferrite exert an important influence upon the initial magnetic permeability of the ferrites and also upon the losses. This is why the total of the impurities in the starting mixture must be at most equal to 0.2% by weight.

The thermal treatment of the cores pressed into the desired shape is performed at a temperature ranging from 1200 to 1250° C. The oven used for this purpose must be supplied with an inert gas such as nitrogen, in which the percentage of oxygen is adjusted so as to obtain a ferrite wherein the percentages of $Fe_2O_3$ and FeO range inside the above indicated limits. By applying the rule which consists in increasing the percentage of oxygen when the percentage of FeO is to high, it suffices to make some experiments to obtain the desired result. As a rule, the percentage of oxygen in the nitrogen gas is lower than 1% and higher than 0.01% in volume, at least at the beginning of the cooling. The duration of heating may vary from 1 hour to 5 hours. The subsequent cooling is slow, that is to say it lasts several hours and in particular less than 10 hours.

In order to obtain the highest values of the initial magnetic permeability, it is necessary to form the ferrite at the highest possible temperature within the above indicated limits. The upper limit of 1250° C. is determined by the fact that, as a rule, if it is exceeded, it gives rise to the formation in the ferrite of crystals which are visible with the bare eye, this formation coinciding with a very important increase of the loss coefficients.

This method of manufacture is illustrated by the two following examples which correspond respectively to Examples I and II of the preceding table.

*Example 1*

I start from pure oxides (total percentages of impurities averaging 0.1% by weight) of iron $Fe_2O_3$, of manganese $Mn_3O_4$, of magnesium MgO and of zinc ZnO, the respective masses thereof being respectively equal to 682.6 g., 198.1 g., 3.3 g. and 115.9 g., which corresponds to molar percentages of 51%, 31%, 1% and 17% for $Fe_2O_3$, MnO, MgO and ZnO respectively.

These oxides are crushed and intimately mixed together in a ball grinder during 20 hours. The mixture thus obtained is pressed to the shape of tores having a substantially rectangular section with an outer diameter of 33 mm. and an inner diameter of 18 mm., the pressure being of 5 tons/sq. cm. for instance. These toroidal elements are then placed in an electric oven and brought to a temperature of 1220° C. for 3 hours. The atmosphere in the oven is constituted by nitrogen containing 0.08% in volume of oxygen. After 3 hours, the heating electric current of the oven is cut off and the thermal inertia is such that this oven returns to room temperature in about 17 hours.

The ferrite thus formed has the molar composition indicated in the Example I of the above table, the supplement of iron that is found to exist being supplied by the grinder. In addition to the properties indicated in this table, this ferrite has the following properties: Curie point=198° C.; induction (for a field of 100 oersteds)= 4500 gauss at 20° C.;

$$\frac{t}{\mu} \cdot 10^3 = 9$$

coefficient of relative variation of the initial magnetic permeability as a function of the temperature in centigrade degrees=$2.10^{-3}$.

*Example 2*

Using the same crushing method as in Example 1, I obtain a very homogeneous mixture of $Fe_2O_3$, $Mn_3O_4$, MgO, ZnO in which the molar percentages of these constituents are respectively 52.6%, 28% (calculated as ⅓ $Mn_3O_4$) 3% and 16.4%. Sintering is effected for 4 hours at 1250° C., the atmosphere of the oven being constituted by nitrogen gas containing 0.2% in volume of oxygen. The ferrite thus obtained has the properties of the Example II of the table.

The present application is a continuation-in-part of my prior applications Ser. No. 274,060, filed Feb. 28, 1952, now abandoned, for "Ferro-Magnetic Ferrite and Method of Manufacturing It," and Ser. No. 339,168, filed Feb. 26, 1953, now abandoned, for "Improvements in Ferromagnetic Materials Constituted by Composite Manganese, Magnesium and Zinc Ferrites and in Methods of Manufacturing said Materials."

What I claim is:

1. A ferromagnetic ceramic material constituted essentially of a crystalline structure containing iron sesquioxide $Fe_2O_3$, manganese protoxide MnO, iron protoxide FeO, magnesium oxide MgO and zinc oxide ZnO, the respective molar percentages of which range from 49.7 to 51% for $Fe_2O_3$, from 24 to 38% for MnO, from .5 to 5.5% for FeO, from .4 to 5% for MgO, the remainder consisting of ZnO, this material having an initial permeability $\mu$ higher than 1000, an eddy current losses coefficient $$\frac{F_n}{\mu} \cdot 10^3$$

lower than .5 and an hysteretic losses coefficient $$\frac{h}{\mu^2} \cdot 10^6$$

lower than 1000.

2. A ferromagnetic ceramic material according to claim 1, in which the molar percentage of FeO ranges from 3.5 to 5.5%, the temperature coefficient of the initial magnetic permeability of said material being practically equal to 0.

3. A method of manufacturing a ferromagnetic ceramic material which comprises forming an initial mixture of fine powders of pure iron sesquioxide, manganese oxide, magnesium oxide and zinc oxide, the respective molar percentages in this mixture ranging respectively from 50% to 56% for the iron sesquioxide $Fe_2O_3$, from 24% to 38% for the maganese oxide calculated as MnO, from .4 to 5% for the magnesium oxide calculated as MgO, the remainder consisting in zinc oxide, compressing said mixture, subjecting the compressed mass to a thermal treatment which includes heating it at a temperature ranging from 1200° C. to 1250° C. in a substantially inert gas atmosphere and slowly cooling down in a substantially inert gas atmosphere containing from .01 to 1% in volume of oxygen at the beginning of the cooling, said thermal treatment being so conducted as to convert a portion of the iron sesquioxide $Fe_2O_3$ in said mixture into iron protoxide FeO the molar percentage of which in the ceramic material ranges from .5 to 5.5%.

References Cited in the file of this patent

UNITED STATES PATENTS

| | | |
|---|---|---|
| 2,535,025 | Albers-Schoenberg | Dec. 26, 1950 |
| 2,640,813 | Berge | June 2, 1953 |

FOREIGN PATENTS

| | | |
|---|---|---|
| 644,639 | Great Britain | Oct. 18, 1950 |
| 730,703 | Great Britain | May 25, 1955 |